United States Patent [19]

Wakabayashi

[11] Patent Number: 5,124,625
[45] Date of Patent: Jun. 23, 1992

[54] POSITION CONTROL SYSTEM

[75] Inventor: Noriaki Wakabayashi, Hirakata, Japan

[73] Assignee: Matsushita Electric Industrial Co., Ltd., Osaka, Japan

[21] Appl. No.: 522,122

[22] Filed: May 11, 1990

[51] Int. Cl.$^5$ .............................................. G05B 1/02
[52] U.S. Cl. ................................. 318/603; 318/608; 318/138; 318/254
[58] Field of Search ......... 318/138, 254, 439, 560-696

[56] References Cited

U.S. PATENT DOCUMENTS

| | | | |
|---|---|---|---|
| 4,400,654 | 8/1983 | Elliott | 318/254 |
| 4,455,513 | 6/1984 | Fulton et al. | 318/138 |
| 4,525,657 | 6/1985 | Nakase et al. | 318/254 X |
| 4,566,046 | 1/1986 | Fujiki et al. | 318/618 X |
| 4,668,900 | 5/1987 | Tabuchi | 318/608 |
| 4,689,540 | 8/1987 | Tani et al. | 318/608 |
| 4,748,386 | 5/1988 | Nakanishi et al. | 318/254 |
| 4,873,477 | 10/1989 | Hirotomi | 318/603 |
| 5,036,264 | 7/1991 | Ueki | 318/254 |

OTHER PUBLICATIONS

"Parameters Governing the Dynamic Performance of Permanent-Magnet Stepping Motors" (A, Hughes Proc. Sixth Annual Symposium of Incremental Motion Control System and Devices, 1977, pp. 39-47).

*Primary Examiner*—Paul Ip
*Attorney, Agent, or Firm*—Wenderoth, Lind & Ponack

[57] ABSTRACT

A position control system equipped with a driving unit including a mover and a stator giving a relative moving force to the mover comprises a position detector for outputting polyphase alternating signals different in phase from each other, a carrier signal generator for generating carrier signals to be modulated by the signals thus outputted, a digital sample-holder for demodulating a position-angle information signal of the modulated carrier signals and a digital calculator for calculating a driving signal to the driving unit. Thus, the position control system makes it possible to provide with a high resolution positioning, low power consumption, high stiffness, prevention of out of stepping, and high speed and vibrationless settling.

34 Claims, 13 Drawing Sheets

POSITION CONTROL SYSTEM

BACKGROUND OF THE INVENTION

1. Field of the Invention

This invention relates to a position control system for moving a certain movable member to a selected position for positioning and more particularly, to an apparatus for moving a head member such as, for example, the data-transducer of a disk drive or the printing head of a printer for positioning and their methods.

2. Description of the Prior Art

Recently, enhancement of performances of information equipment is surprising and accompanied with which, a driving means used for the data-transducer of a disk drive or the printing head of a printer has been required to provide with a position control system operable at a higher speed and accuracy as well as a finer resolution.

Conventional driving means for use in such information equipment have frequently used an open-loop position control system utilizing a stepping motor.

Hybrid-Permanent-Magnet type of stepping motor has been widely used for this purpose. This type of motor has a rotor consisting of a permanent magnet magnetized in the direction of rotating axis and a couple of magnetic materials mounted on both sides of the permanent magnet. These magnetic materials are respectively provided with arrays of magnetic pole-teeth engraved at constant pitches in the circumferential peripheries. On the other hand, the motor of this type has a stator consisting of a magnetic material core having groups of magnetic pole-teeth on its surface in confronting relation to the rotor and a plurality of coils provided in the slots of the magnetic material core.

Current-feeding circuit for the stepping motor of hybrid-permanent-magnet type includes bridge-circuits respectively structured of a plurality of semiconductor switches and these coils are connected between the middle points of these bridge-circuits. So connected that if these switches are successively switched, currents can be alternatively flowed in these coils in order. As a result, the rotor changes the position to rotate due to the series of magnetization of these coils. With the most typical 2-phase feeding stepping motor, the rotor rotates by $\frac{1}{4}$-teeth pitch (90° in terms of electric angle) by synchronizing with an inputted stepping pulse signal.

The usual open-loop position control system utilizing the stepping motor shown above is well-known in U.S. Pat. No. 4,568,988; "Position Control System of a Disk System". Such an open-loop position control system offers the advantage of using electronic control circuit simple in structure. Input signals to the electronic circuit are the stepping pulse signal and a command signal for the moving direction. The outputs from the electronic control circuit are the feeding-currents. The electronic control circuit consists mainly of the above-mentioned bridge-circuits and a sequence circuit for switching the semiconductor switches in response to the above-mentioned input signals. The usual open-loop position control system supplies currents to the coils of the stepping motor through the bridge-circuits and the sequence circuit in response to these input signals to rotate the rotor. As a result, a head member such as, for example, the data-transducer of a disk drive or the printing head of a printer can be moved for positioning. The term "open-loop" means that the moving distance of head member can be determined by the number of stepping pulses of an input signal only.

Such a conventional position control system as utilizes a stepping motor as a driving means makes possible that by the number of stepping pulse signals and the command signal for moving direction, for example, the head member can be moved for positioning, so that the control can be easily achieved by means of a microprocessor. In addition, the system offers the higher effectiveness of power as compared to a system utilizing a driving means such as, for example, the voice coil motor or servo-motor. This is because a power device such as the stepping motor having tooth-shaped magnetic pole-teeth in the magnetic circuit is superior in the magnetic effectiveness and an extremely large torque can be generated even by a small current. As a result, this system was characterized by being less in power consumption.

However, some problems have been pointed out on the speed and accuracy of this system. A case in point is that when the stepping motor as a driving means is to be stopped for positioning, it will become vibrative around a standstill position. This means that it may require a considerable settling time for positioning. In order to decrease the vibration thereby to reduce the settling time, the rotor or movable members can be provided with a mechanical viscous damping. However, this may result in a complex structure or may cause the high speed operation to be prevented due to this viscous damping, which have been pointed out for this system as disadvantages such as not to be pointed out for that utilizing a voice coil motor or servo-motor.

Also, the stepping motor can obtain a speed synchronized with the stepping pulse signal. As a result, in order to move a moving member at a higher speed, the frequency of a stepping pulse signal can be increased on a theoretical basis. When driven at a higher speed, however, differing from the case when driven at a lower speed with a large torque, because of the effect of a time constant or magnetic hysterisis loss that a coil possesses, the rising of a current will be delayed, and the torque can not be developed effectively, resulting in the generation of a small torque. In this case, to attempt to unreasonably enhance the frequency of the stepping pulse signal will easily cause an out of stepping to take place.

A position control system having the timing of a stepping pulse signal controlled by providing sensor elements on the moving member of the stepping motor in order to prevent the out of stepping has been disclosed in U.S. Pat. No. 4,044,881 as an example showing the application for a serial printer. This system senses the presence of the magnetic pole-teeth to produce a pulse signal and then, controls the timing of the generation of a stepping pulse signal in response to this pulse signal thereby to prevent the out of stepping. However, this method can do the timing control only, so that when, for example, a vibration or impact is applied from the outside, it is difficult to prevent such a disturbance.

In addition, if the magnetic pole-teeth pitch of each of the rotor and stator is made small to increase the number of teeth, one step angle can be decreased, so that the resolution of positioning of a moving member is ought to be increased. However, in practice, not only there exists a limitation upon the mechanical accuracy, but also the switching frequency of the current of each coil is increased, so that the effectiveness can be rapidly decreased. This is explained in detail in "Parameters Governing the Dynamic Performance of Permanent- Magnet Stepping Motors" (A, Hughes Proc. Sixth Annual Symposium of Incremental Motion Control System and Devices, 1977, pp. 39-47). In addition, in order to improve the resolution of positioning, if the magnetic pole-teeth pitches of the rotor and stator are made small to increase the number of them thereby to decrease one step angle, there exists such a trend that the stiffness and position holding ability against a vibration or impact from the outside become small.

SUMMARY OF THE INVENTION

An object of the present invention is to eliminate occurrence of an out of stepping which may take place in a conventional open-loop position control system utilizing a stepping motor as a driving means thereby to provide a position control system operable at a higher speed.

Another object of the present invention is to provide a position control system capable of eliminating disadvantageous vibrative positioning and longer settling time for positioning which have been pointed out in the conventional position control system.

Still another object of the present invention is to provide a position control system capable of obtaining a higher resolution of positioning and a higher value of stiffness.

A further object of the present invention is to provide a position control system superior in power effectiveness and low in power consumption.

In order to attain the above-mentioned objects, a position control system of the present invention has a driving means including a mover and a stator which can move the mover relative thereto by giving a relative moving force to the mover. The position control system comprises:

a position detecting means for outputting polyphase alternating position signals which are different in phase from each other in response to a relative movement of the mover to the stator;

a carrier signal generating means for generating a carrier signal modulated by the polyphase alternating position signals from the position detecting means;

a digital position signal generating means including a digital sample-hold means for demodulating phase-angle information of the carrier signal thus modulated to digitally produce relative position information indicative of a relative position between the mover and the stator;

a digital calculating means for calculating a driving signal in response to an error between the relative position information and an externally given position command signal; and a current feeding means for feeding currents to the driving means in response to the driving signal.

Further preferably, the position control system of the present invention comprises;

the mover and the stator at least one of which equips with magnetic material members having arrays of magnetic pole-teeth engraved at constant pitches;

a memory means which is provided in the digital calculating means and has a tabulated data according to a specific function; and a function generating means for reading a data from the tabulated data according to the specific function of the memory means in response to the error signal between a relative position information signal between the mover and stator and a position command signal from the outside thereby outputting the data thus read as a driving signal to the feeding means.

So structured as above that the position control system of the present invention effectively operates as follows;

First, the system makes it possible to generate the torque of the driving means always effectively, contributing to a reduction in power consumption. This is achieved in such a way that the position detecting means detects a relative position between the mover and stator of the driving means, a relative position information signal between the rotor and the stator is digitally produced a higher resolution from the position detecting means, an error signal is calculated between the relative position information signal and a position command signal from the outside and the digital calculating means effectively controls the driving signal to the driving means in response to the error signal thus obtained.

In addition, the movable member can be moved at a higher speed without taking place the out of stepping. This is because the position detecting means detects a relative position between the mover and stator of the driving means to digitally produce a relative position information signal therebetween and the movable member is moved by a closed-loop position control in response to thus digitally produced relative position information signal.

Also, at the same time, the movable member to be positioned can be quickly settled to a target position under depressed vibrative condition. This is achieved by providing the control system with a suitable damping by the digital calculating means.

In addition, the digital position signal generating means makes the position control with a higher resolution possible.

Further in addition, a higher stiffness than would be obtained conventionally can be easily obtained by the digital calculating means.

DESCRIPTION OF THE PREFERRED EMBODIMENTS

Figure 1:
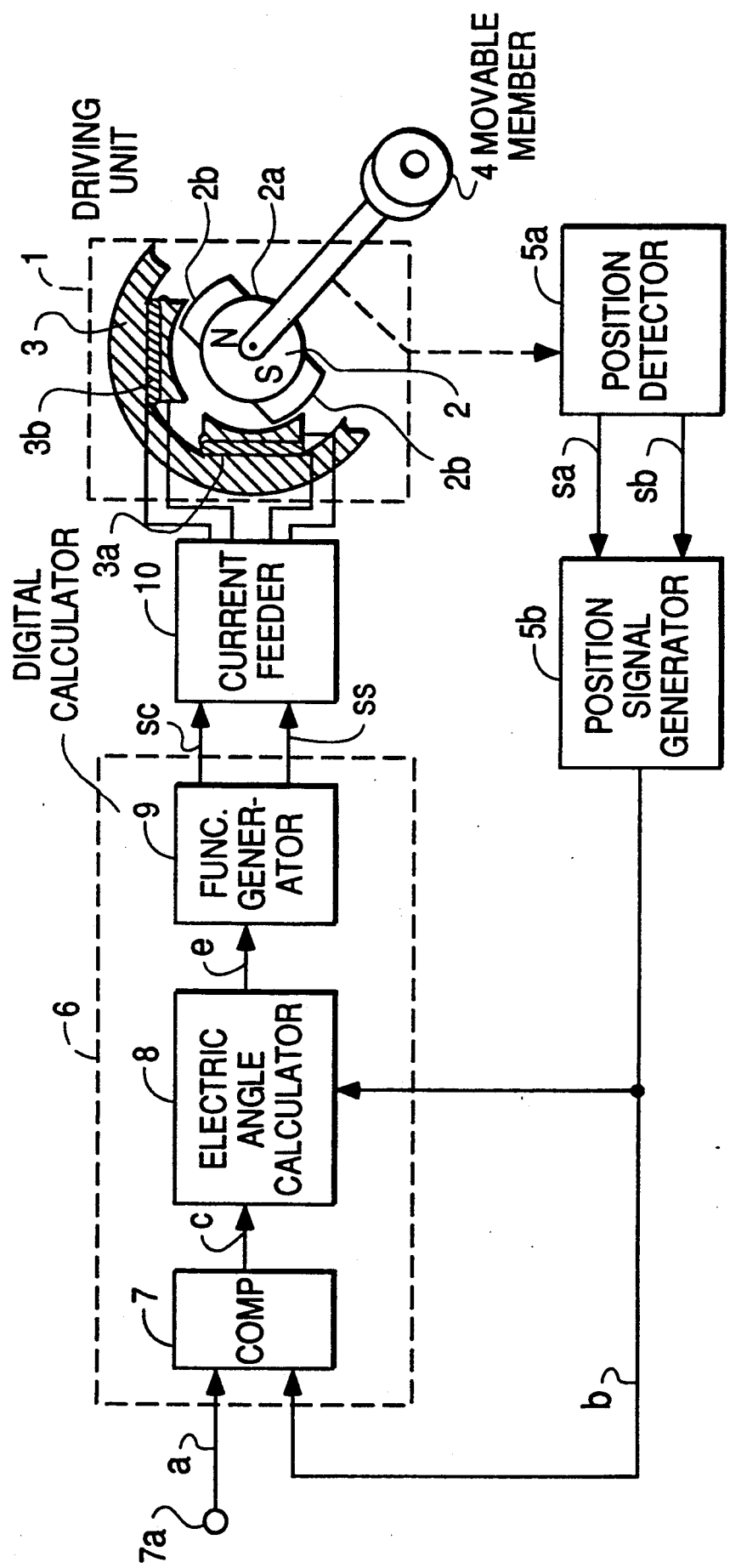
FIG. 1 is a block diagram showing a position control system according to an embodiment of the present invention.

Position control system according to one embodiment of the present invention will be described below while referring to the drawings.

FIG. 1 is a block diagram showing a position control system according to the embodiment of the present invention. In FIG. 1, a rotary-type motor such as, for example, the stepping motor is used as a driving unit. The reference numeral 2 indicates a rotor (mover) which includes a permanent magnet 2a and arrays of tooth-shaped magnetic pole-teeth 2b made of magnetic material. 3a and 3b are respectively coils wound in the slots of a magnetic material core, which constitute a stator 3 together with the magnetic material core in confronting relation to the rotor 2 via a predetermined space. A driving unit 1 consists mainly of the rotor 2 and the stator 3. Movable member to be positioned is indicated at 4. At 5a is indicated a position detector which detects a position of the rotor 2 or a position of the movable member to be positioned and outputs 2-phase sine-wave alternating position signals sa and sb which are different in phase by 90° from each other. 5b is a digital position signal generator which receives the 2-phase sine-wave alternating position signals sa and sb outputted from the position detector 5a and outputs the digital position signal b of the rotor 2 with a high resolution on a digital basis. The digital position signal b is a signal for indicating the absolute position of the movable member to the positioned in the movable range at a high resolution level with a certain reference point as the origin. A comparator (COMP) is indicated at 7, which receives the digital position signal b of the rotor 2 and a position command signal a which is supplied to an input terminal 7a from the outside and outputs a position error signal c (=a−b). 8 is an electric angle calculator which receives the position error signal c to execute a calculation for servo-control and outputs an electric angle signal e. 9 is a function generator (FUNC. GENERATOR) which outputs 2-phase sine-wave signals sc and ss equivalent to driving signals for the driving unit 1 in response to the electric angle signal e. 6 is a digital calculator including the comparator 7, electric angle calculator 8 and function generator 9. 10 is a current feeding circuit which amplifies the 2-phase sine-wave signals sc and ss equivalent to the driving signals outputted from the function generator 9 to feed currents to the coils 3a and 3b of the driving unit 1, respectively.

Figure 2A:
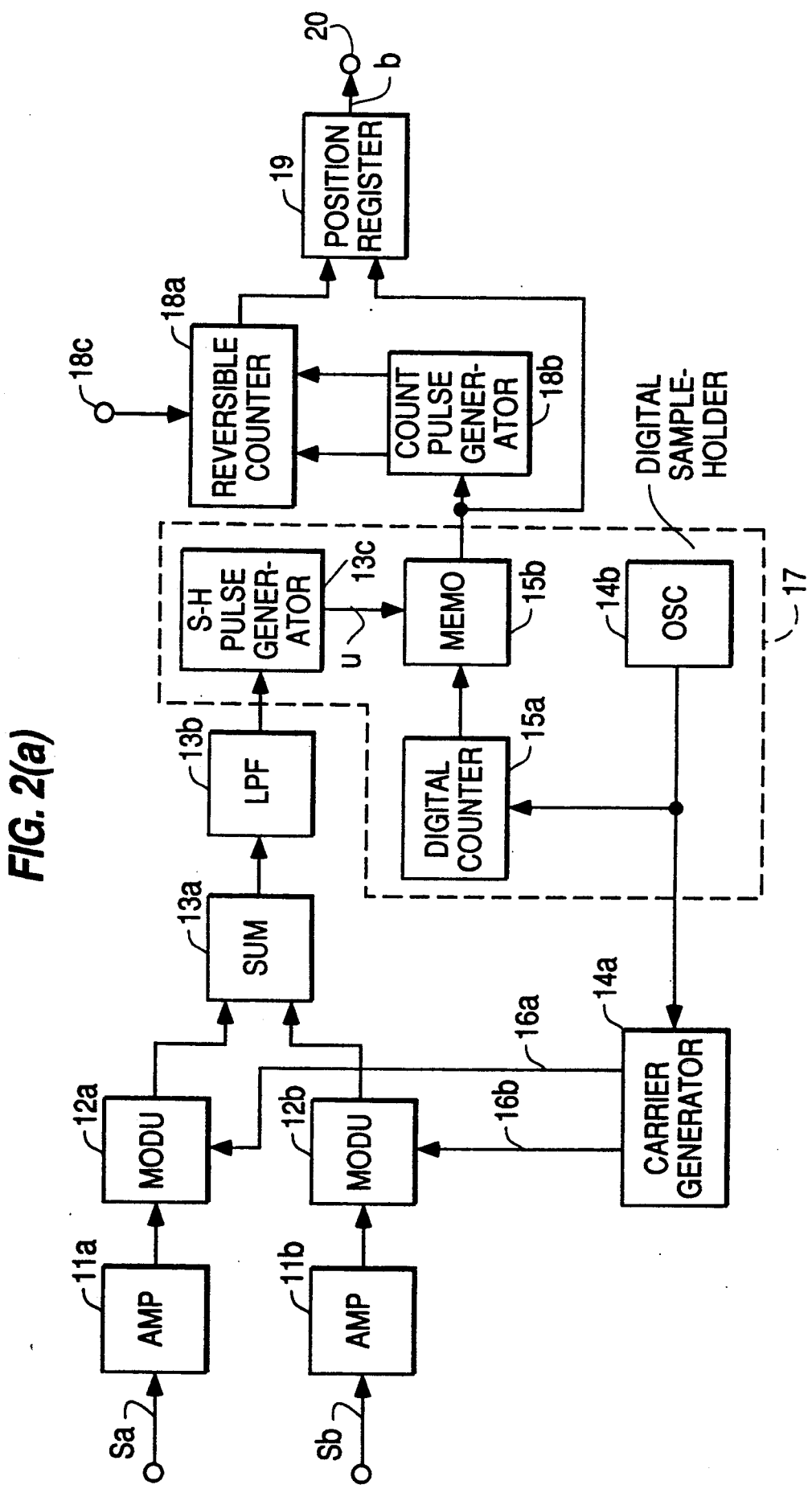
FIGS. 2 (a) and (b) are respectively block diagrams showing examples of the digital position signal 5b shown in FIG. 1.
Figure 2B:
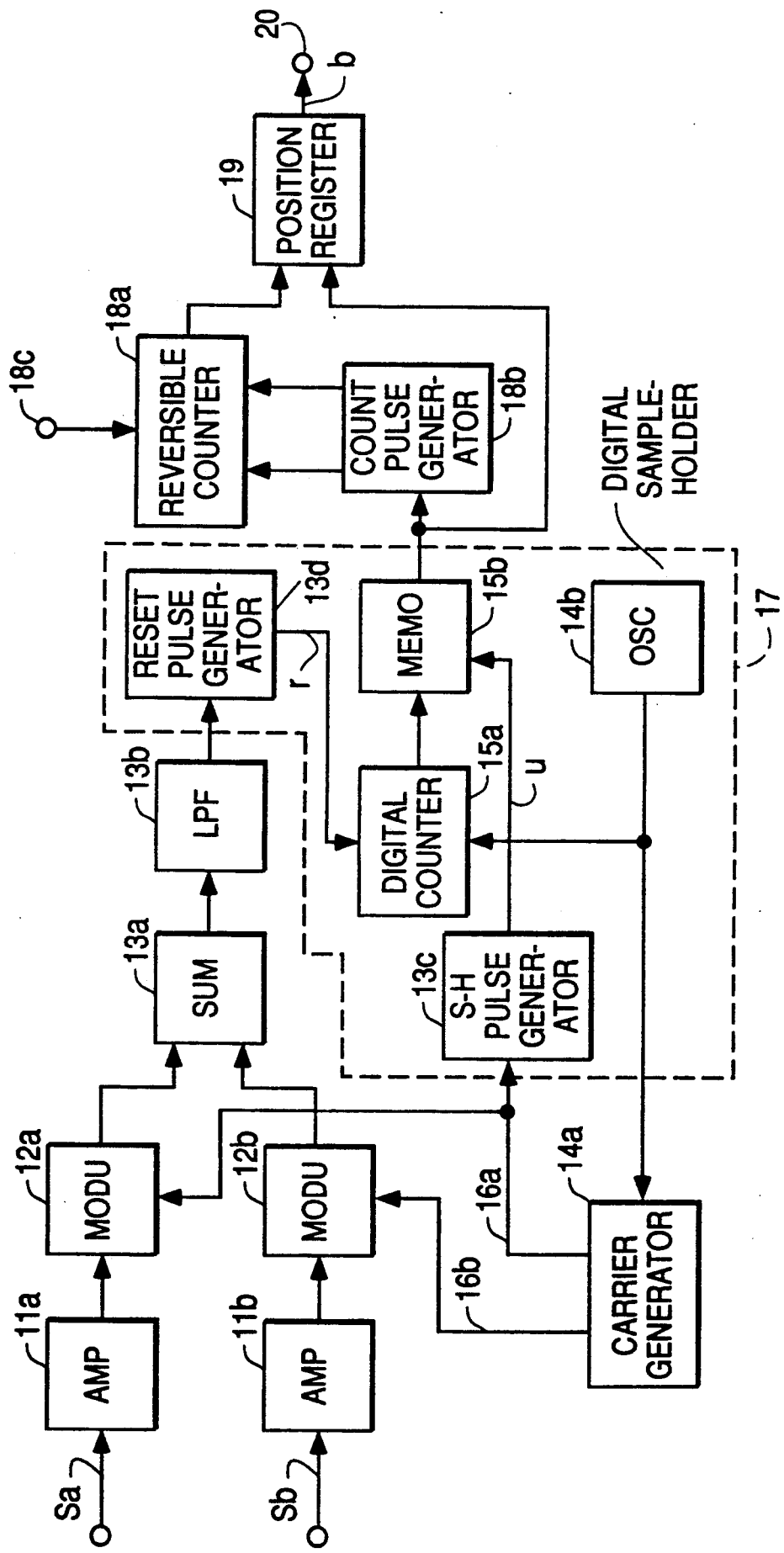

FIGS. 2 (a) and (b) each is a block diagram showing an example of the position signal generator 5b in FIG. 1. In FIG. 2 (a), 11a and 11b are amplifiers (AMP) respectively for amplifying the 2-phase sine-wave alternating position signals sa and sb different in phase by 90 from each other outputted from the position signal detector 5a. 12a and 12b are modulators (MODU) which are a kind of multiplier for modulating the high frequency carrier signals 16a and 16b respectively by the 2-phase sine-wave output signals from the amplifiers 11a and 11b. A carrier signal generator 14a divides a reference clock generated by an oscillator (OSC) 14b into 1/n thereby to produce the carrier signals 16a and 16b. The carrier signals 16a and 16b differ in phase by 90 from each other and are sent through the carrier signal generator 14a to the modulators 12a and 12b, respectively. Summing circuit (SUM) 13a sums up the signals modulated through the modulator 12a and 12b. Law-pass filter (LPF) 13b removes harmonic components from the modulated output signal summed-up by the summing circuit 13a to extract a basic frequency component only. Sample-hold pulse signal generator (S-H PULSE GENERATOR) 13c converts the basic frequency component into a square wave and then, generates a sample-hold pulse signal u. 15a and 15b indicate a digital counter for demodulating phase-angle information contained into the square wave of the basic frequency component and a temporary memory (MEMO) for sample holding, respectively. The digital counter 15a counts the reference clock to produce a digital sawtooth wave.

The temporary memory 15b is a temporary storing circuit such as, for example, the memory, register or latch circuit and sample-holds a count value of the digital counter 15a by means of the sample-hold pulse signal u. 17 indicates a digital sample-holder which comprises the sample-hold pulse signal generator 13c, digital counters 15a and 15b and the oscillator 14b and serves to demodulate the phase-angle information contained into the square wave of the basic frequency component. The digital counter 15a counts the reference clock, but if the maximum count value is expressed by n, by demodulating the phase-angle information contained into the square wave of the basic frequency component, the digital sample holder 17 can digitally execute n-division (interpolation) of the range of one period pitch of the 2-phase sine-wave alternating position signals sa and sb which are different in phase by 90° from each other outputted from the position signal detector 5a. However, such execution has only an ability to discriminate phase-angles within the range of one period pitch of the alternating position signals sa and sb. Therefore, to make possible the discrimination of phase-angles in wider range than above, a reversible counter 18a is provided for counting the number of the alternating position signals that exceeds one period pitch. Reversible count pulse generator (COUNT PULSE GENERATOR) 18b produces an up-count pulse or a down-count pulse respectively every time when the content of the temporary memory 15a is rapidly changed from zero (or a value near zero) to n (or a value near n) and from n (or a value near n) to zero (or a value near zero). The reversible counter 18a receives the up-count pulse or down-count pulse to up-count or down-count, respectively. 18c indicates an origin.initial reset signal input terminal for the reversible counter 18a. 19 indicates a position register for summing the content of the reversible counter 18a and the content of the temporary memory 15b respectively as an upper bit portion and a lower bit portion. 20 is an output terminal of the position register 19 to constitute an output of the digital position signal generator 5b (a digital position signal b for the rotor 2).

Here, the principle of the digital position signal generator 5b will be explained.

Suppose that when the 2-phase sine-wave alternating position signals sa and sb from the position signal amplifiers 11a and 11b are expressed in terms of $E_A(\theta)$ and $E_B(\theta)$, respectively, the following can be established;

$$E_A(\theta) = E \cos (2\pi\theta/\theta_p) \tag{1a}$$

$$E_B(\theta) = E \sin (2\pi\theta/\theta_p) \tag{1b}$$

where, $\theta$ is a rotational angle (position) of the rotor 2, $\theta_p$ is one period pitch of the sine-wave alternating position signals outputted from the position signal detector 5a, and E is a crest value of the sine-wave position signals. On the other hand, if the carrier signals 16a and 16b are expressed in terms of $C_A(t)$ and $C_B(t)$, respectively, the following can be obtained;

$$C_A(\theta) = \text{COS}(2\pi f_C t) \quad (2a)$$

$$C_B(\theta) = \text{SIN}(2\pi f_C t) \quad (2b)$$

where, $f_C$ is a carrier frequency. If the result obtained through the summing circuit 13a after modulated by the modulators 12a and 12b is expressed in terms of $P(t, \theta)$, from Eqs.(1a), (1b), (2a) and (2b), the following may be found as;

$$\begin{aligned}P(t, \theta) &= E_A(\theta) \cdot C_A(\theta) + E_B(\theta) \cdot C_B(\theta) \quad (3)\\ &= E\{\text{COS}(2\pi\theta/\theta_p) \cdot \text{COS}(2\pi f_C t) +\\ &\quad \text{SIN}(2\pi\theta/\theta_p) \cdot \text{SIN}(2\pi f_C t)\}\\ &= E\text{COS}(2\pi f_C t - 2\pi\theta/\theta_p)\end{aligned}$$

This means that phase-angle member with a phase-angle information of $2\pi\theta/\theta_p$ is contained into a carrier signal having the frequency of $f_C$. That is, $P(t, \theta)$ has the position information converted into the form of phase-angle information. As a result, the modulation of the phase-angle information of $P(t, \theta)$ makes it possible to recognize a position of the rotor 2. In addition, in order to detect a position of the rotor 2 accurately from $P(t, \theta)$, the position signals $E_A(\theta)$ and $E_B(\theta)$ are required to have a waveform of sine-wave which has less distortion with respect to the relational position $\theta$. Large distortion results in a bad linearity. The low-pass filter 13b serves to eliminate the harmonic elements contained in $P(t, \theta)$. Generally, this is because the carrier signals 16a and 16b are substantially a square wave containing a lot of harmonic waves. Next, the signal $P(t, \theta)$ summed-up through the circuit 13a after modulation is required to be demodulated to separate the phase-angle information $2\pi\theta/\theta_p$ only to be fetched. In this embodiment, a phase difference of the signal $P(t, \theta)$ to the carrier signals is demodulated by the digital sample holder 17, which is carried out in such a simple method that the reference clock is counted by the digital counter 15a first to form a digital sawtooth wave, then a sample-hold pulse signal u is formed from the signal $P(t, \theta)$, and the digital sawtooth wave of the digital counter 15a ia sample-held by means of this pulse u. Concretely, the content counted by the digital counter 15a is sent with the sample-hold pulse signal u to the temporary memory 15b. The sample-hold pulse signal u does the waveform shaping of the signal $P(t,\theta)$ to make it square, which is produced from the edge of its rise (or its fall). So structured as above that the phase-angle information $(2\pi\theta/\theta_p$ contained in the signal P(t, 8 ) is digitally held in the temporary memory 15b. If the carrier signal frequency is expressed by $f_C$ and a reference clock $n \cdot f_C$ having a frequency n-times of $f_C$ is counted by a digital counter whose maximum count value is n, the phase-angle difference can be measured at a 1/n resolution per period. This means that it has a resolution to divide a phase angle of $2\pi$ into equals parts of n. The phase-angle $2\pi$ corresponds to one period pitch $\theta_p$ of sine-wave alternating position signals outputted by the position signal detector 5a. As a result, the digital position signal generator 5b can interpolate the one period pitch $\theta_p$ of the alternating position signals from the position signal detector 5a at an equal space of $2\pi/n$ to a rotational position of the rotor 2. However, the content to be counted by the digital counter 15a is a digital sawtooth wave whose maximum count number is n and this sawtooth is repeatable. Therefore, the digital counter 15a has only an ability to discriminate a rotational position of the rotor 2 within the range of one period pitch of the alternating position signals. As a result, to make the discrimination possible to do in a wider range, the reversible counter 18a is provided to count the number of the alternating position signals that exceed one period pitch $\theta_p$. The reversible count pulse generator 18b produces an up-count pulse or a down-count pulse respectively every time when the content of the temporary memory 15b is rapidly changed from zero (or a value near zero) to n (or a value near n) or vice versa thereby to send it to the reversible counter 18a for up-counting or down-counting. As a result, the reversible counter 18a indicates upper bits of the position information and on the other hand, the temporary memory 15a indicates lower bits of the position information. The content of the reversible counter 18a and that of the temporary memory 15b respectively are summed up in the position register 19 as the upper bit portion and the lower bit portion and stored thereinto.

FIG. 2 (b) is, similar to FIG. 2 (a), a block diagram showing an example of the digital position signal generator 5b shown in FIG. 1. This resembles in structure to that shown in FIG. 2 (a). What is different between the both is the structure of the digital sample holder 17. Explanation will be made on this difference as follows; Also, in FIG. 2 (b), any blocks having equal or equivalent functions to those in FIG. 2 (a) have same names and numbers. The digital sample holder 17 in FIG. 2 (b) also is to obtain a phase difference of the signal $P(t, \theta)$ to the carrier signals (that is, to phase-demodulate), which means that their operational purposes are the same. Concretely, first, the digital sample holder 17 in FIG. 2 (b) differs from that in FIG. 2 (a) in that the sample hold pulse generator 13c forms the sample hold pulse signal u from the carrier signal 16a. Accompanied with which, a digital sawtooth wave formed by the digital counter 15a is periodically reset by a reset pulse signal r generated through a reset pulse signal generator 13d in response to the signal P (t, $\theta$). This constitutes another different point from the preceding example. With the above-mentioned structure, a digital sawtooth wave is formed based on the signal $P(t, \theta)$ to sample-hold it by a carrier, thus the phase difference between the both being held in the temporary memory 15b, which is just opposite in method to the preceding example shown in FIG. 2 (a). In FIG. 2 (a), though equivalently, the digital sawtooth wave is formed based on the carrier signals and sample-held by means of the signal $P(t, \theta)$. The system shown in FIG. 2 (b) is slightly complex in structure compared with that in FIG. 2 (a), but substantially equivalent functions can be obtained.

Figure 3:
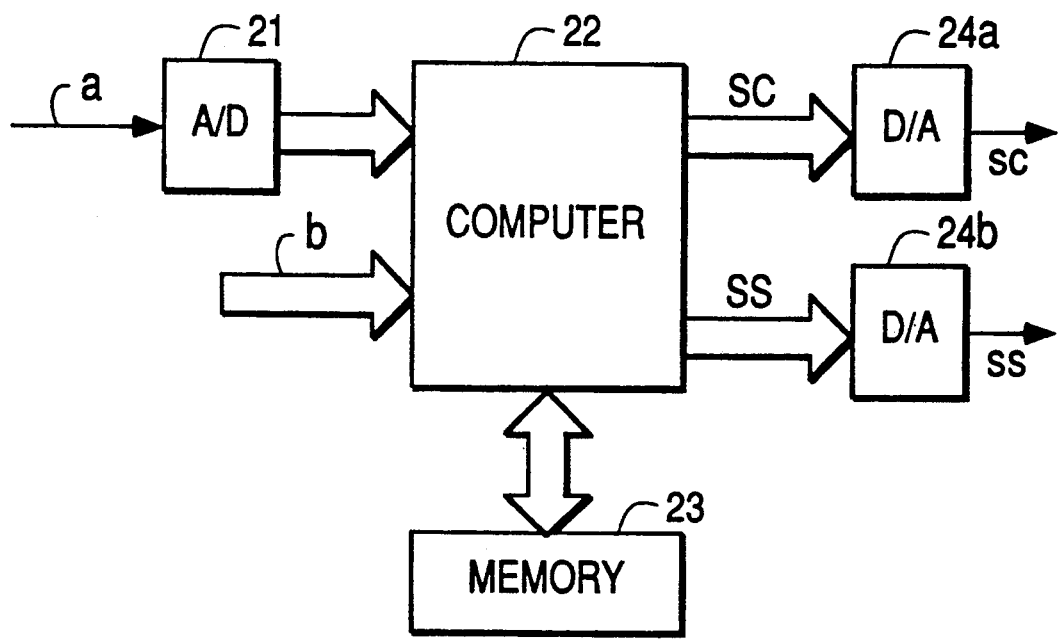
FIG. 3 is a block diagram of a digital calculator showing a concrete example of the digital calculator 6 in FIG. 1.

FIG. 3 is a block diagram showing a concrete example of the digital calculator 6 in FIG. 1. In this embodiment, the comparator 7, electric angle calculator 8 and function generator 9 of the digital calculator 6 are respectively structured of an A/D converter 21, a computer 22, a memory 23 and D/A converters 24a and 24b. The A/D converter 21 converts a position command signal a sent from the outside to input terminal 7a into a digital signal. The computer 22 is structured of an arithmetic logical unit for executing calculation and a sequencer for controlling the proceedings, and operates in accordance with a predetermined built-in program (described later on) stored in the ROM (read only memory) area of the memory 23. First, the computer 22 receives an output from the A/D converter 21 and a digital position signal b of the rotor 2 outputted from the digital position signal generator 5b, stores them into a register or RAM (random access memory) area of the memory 23, and then, carries out a predetermined digital calculation including adding-subtracting process for producing the electric angle signal e. Also, the computer 22 refers to the function tables of sine-wave and cosine-wave being stored in the ROM area of the memory 23 in response to this electric angle signal e to produce signals SC and SS and sends them respectively to the D/A converter 24a and the D/A converter 24b. The D/A converters 24a and 24b carry out the digital-analog conversion of the 2-phase signals SC and SS into 2-phase analog signals sc and ss and output them. In addition, in case that the position command signal a sent from the outside to the input terminal 7a is digital, the A/D converter 21 can be omitted.

Figure 4:
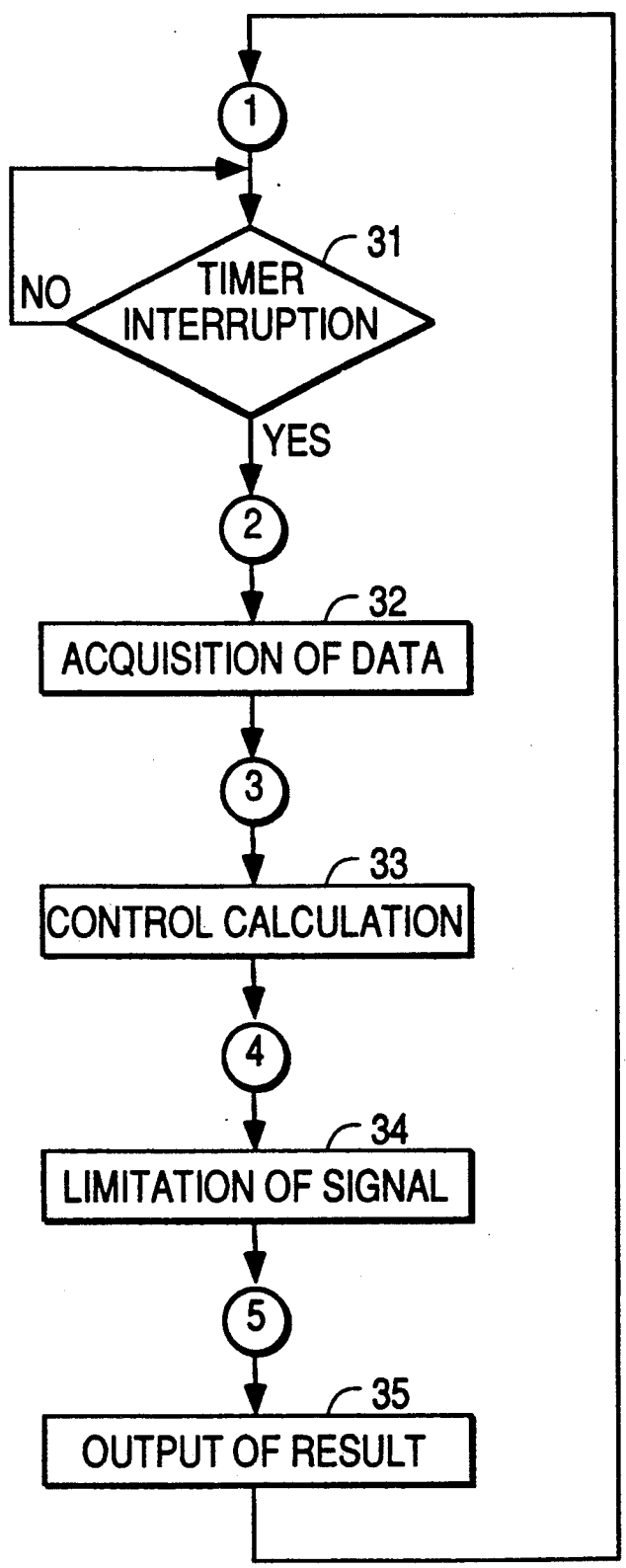
FIG. 4 is a basic flow chart of a program showing an example of the built-in program stored in the ROM area of a memory shown in FIG. 3.
Figure 5A:
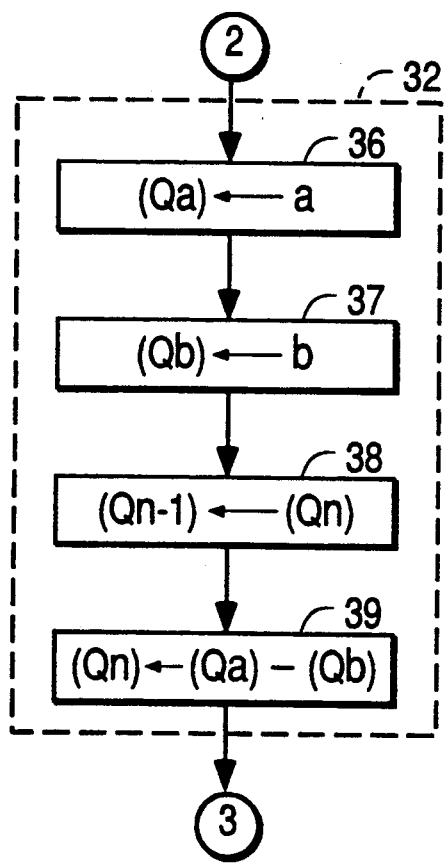
FIGS. 5 (a), (b), (c) and (d) are concretely exemplified detailed flow charts of the processes 32, 33, 34, and 35 in FIG. 4, respectively.
Figure 5B:
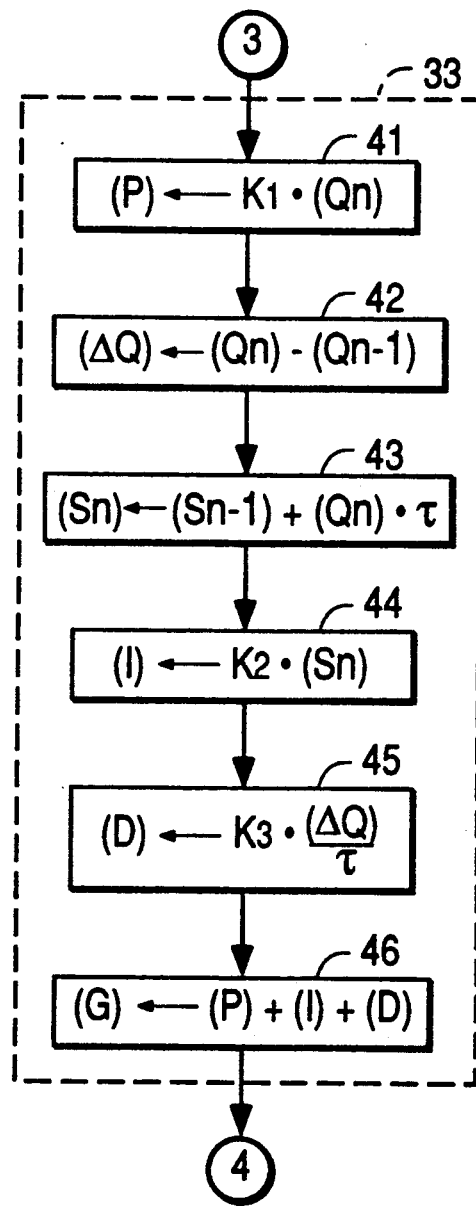
Figure 5C:
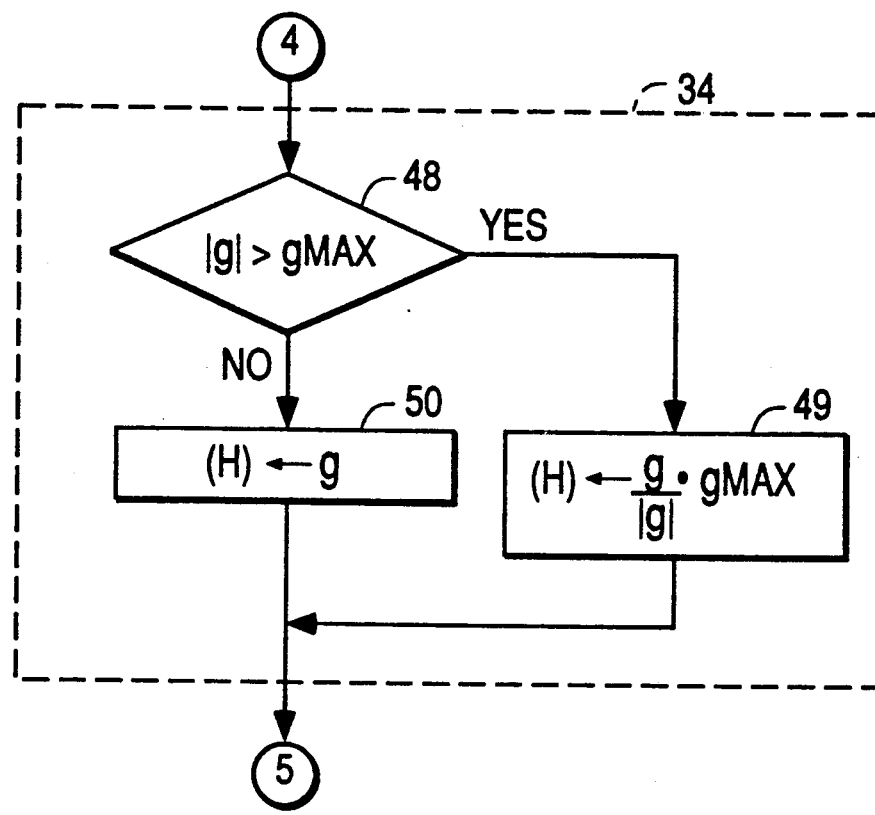
Figure 5D:
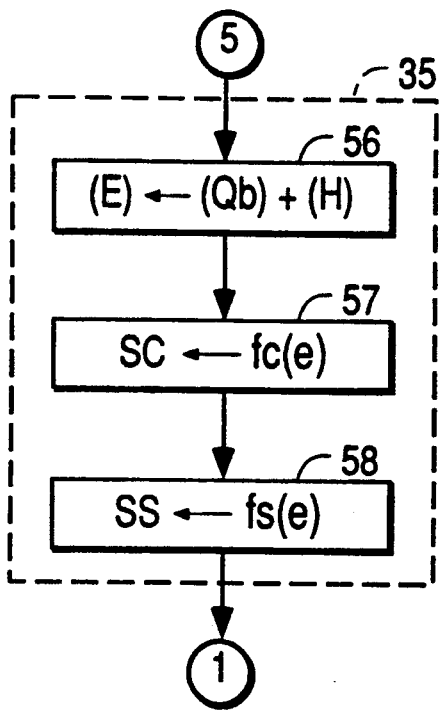

Next, built-in program being stored in the ROM area of the memory 23 will be outlined while referring to the flow chart shown in FIG. 4.

FIG. 4 is a basic flow chart showing an example of the built-in program being stored in the ROM area of the memory 23 shown in FIG. 3. In this case will be started from ①. A first process 31 waits an interruption from a timer. The time generates an interrupt signal by predetermined time $\pi$ and if interrupted, it will be shifted to ". That is, the following processes will be performed by sampling period $\pi$; Process 32 is for acquisition of data to receive the digital position signal b and stores it in a predetermined register or RAM area Qb. Process 33 is for control calculation and carries out a predetermined control calculation in response to the position error signal c between the position command signal a and the digital position signal b thereby to produce an electric angle signal g in order to position the rotational position of the rotor 2 to a reference position shown by the position command signal a. Process 34 is for limitation of signal and restricts the electric angle signal g within a predetermined limit for producing an electric angle signal h. Process 35 is for output of the result obtained by adding corrections to the calculation results shown above and refers to the function tables of sine-wave and cosine-wave being stored in the ROM area of the memory 23 in response to the digital position signal b of the rotor 2, the electric angle signal h obtained through the process 34 and the like thereby toe produce 2-phase signals SC and SS, and sends them to the D/A converters 24a and 24b, respectively. After completion of the process 35, it will be returned to ①.

Next, detailed explanations will be made on the processes 32 to 35 while referring to FIGS. 5 (a), (b), (c) and (d).

FIG. 5 (a) is a flow chart showing a concrete example of the process 32 in FIG. 4. In FIG. 5 (a), processes 36 and 37 respectively store the position command signal a and the digital position signal b of the rotor in their predetermined registers or RAM areas Qa and Qb. Process 38 stores the content of a predetermined register or RAM area Qn holding the value at the preceding sampling time into another area Qn−1. Provided, the area Qn is a register or RAM area for storing the digital signal corresponding to the position error signal c between the position command signal a and the digital position signal b. Next, the process 39 newly calculates the digital signal corresponding to the position error signal c between the position command signal a and the digital position signal b ($c = a - b$ or $(Qn) \leftarrow (Qa) - (Qb)$) and stores it in the area Qn. That is, at this time, the position error signal between the present rotational position of the rotor 2 and the position command signal is stored in the area Qn and the position error signal at the preceding one sampling time is to be stored in the area Qn−1. The processes show above correspond to the process by the comparator 7. Hereinafter, (Qn) will indicate the content of Qn.

FIG. 5 (b) is a flow chart showing a concrete example of the process 33 in FIG. 4. In FIG. 5 (b), first, a process 41 multiplies the content of Qn holding the value corresponding to the position error signal c ($= a - b$) between the position command signal a and the digital position signal b at the present time by K1 and stores the result thus obtained into a predetermined register or RAM area P. The content of the P becomes a factor proportional to the content of Qn. Process 42 subtracts the content of Qn−1 holding the value corresponding to the position error signal c at the preceding one sampling time from the content of Qn holding the value corresponding to the position signal c at the present time and stores the result thus obtained into a predetermined register or RAM area ΔQ. Process 43 multiplies the content of Qn by sampling time $\tau$, that is, calculates the value (Qn)·$\tau$, then adds the content of a predetermined register or RAM area Sn−1 at the preceding one sampling time to the result thus calculated and stores the added result into another area Sn. That is, it carries out the following equation (4) and stores the obtained result into a variable Sn;

$$(Sn) = (Sn - 1) + (Qn) \cdot \pi \qquad (4)$$

In Eq. (4), the content of Qn indicates the position error signal c between the position command signal a and the digital position signal b, and if there exists a static position error between the position command signal a and the digital position signal b, the term Qn·$\pi$ will be added to the term (Sn − 1) by every sampling. As a result, as the content of Sn increases with a time, the static position error between the signals a and b can be eliminated by making a closed-loop servo-system based on this. If the sampling period is substantially small, the content of Sn shown in Eq. (4) can express the result obtained by integrating the position error signal c by time. That is, the process 43 is to obtain an integral factor by accumulating the error signal by time. Next, a process 44 multiplies the content of Sn by K2 and stores the result thus obtained into a predetermined register or RAM area I. The content of the area I becomes an integral signal. Next, in a process 45, the value (ΔQ)/$\pi$ obtained by dividing the content of the ΔQ by the sampling period $\pi$ is multiplied by K3 and the result thus obtained is stored into a predetermined register or RAM area D. Namely, the processes 42 and 45 respectively obtain a differential factor by differentiating the error signal by time. The content of D becomes a differential signal. Process 46 sums up the all contents of the areas P, I and D respectively obtained through the processes 41, 44 and 45 to produce the electric angle signal g and stores the result thus obtained into a predetermined register or RAM area G. Then, it goes to $.

The above-mentioned processes are known as the PID compensation which makes it possible to provide stability in the system as well as to improve the stiffness (or the position holding torque against a vibration or an impact from the outside) and the position traceability to the position command signal a.

FIG. 5 (c) shows a flow chart showing a concrete example of the process 34 in FIG. 4. Process 48 compares the absolute value of the electric angle signal g obtained through the process 33 with a preset constant $g_{MAX}$. If $|g| > g_{MAX}$, it goes to a process 49. If not so, the signal g is stored in a predetermined register or RAM area H in a process 50 and directly goes to %. In the process 49, the sign of the signal g is retained and it is also stored in the area H with its value as $g_{MAX}$, then going to %. The signal of this H is called an electric angle signal h. The process 34 is for limiting the electric angle signal to a predetermined range, which is called limitation of electric angle. The principle and functions thereof will be described in detail later.

FIG. 5 (d) is a flow chart showing a concrete example of the process 35 in FIG. 4. In a process 56, addition of the electric angle signal h obtained through the process 34 and the digital position signal b is carried out to produce the electric angle signal e thereby storing it into a predetermined register or RAM area E. Processes up to the production of the electric angle signal e as described above constitute main processes of the electric angle calculator 8. Processes 57 refers to the cosine-wave function table being stored in the ROM area of the memory 23 in response to the electric angle signal e obtained through the process 56 (in general case, the upper bits of the signal e are neglected, being in response to the lower bits of the signal e) thereby to produce a cosine-wave signal SC=fc(e). Similarly, a process 58 refers to the sine-wave function table being stored in the ROM area of the memory 23 in response to the electric angle signal e thereby to produce a sine-wave signal SS=fs(e). Finally, the 2-phase signals SC and SS are respectively sent to the D/A converters 24a and 24b. The above-mentioned processes constitute main processes of the function generator 9. (Explanations on successive operations by referring to FIGS. 1 and 3 are that the D/A converters 24a and 24b respectively convert the digital signals SC and SS into analog signals sc and ss and send them to the current feeding circuit 10. The 2-phase signals sc and ss are amplified through the circuit 10, then converted into 2-phase current signals (or voltage signals) proportional to the signals sc and ss, and sent to the 2-phase coils 3a and 3b provided on the magnetic material core of the stator 3, respectively.)

Then, the flow of program is returned to the top process ① for waiting the next timer interruption.

Next, explanations will be made on the functions and operations of a position control system according to an embodiment of the present invention while referring to the drawings attached. First, the principles of torque generation and position control will be explained using FIG. 6.

Figure 6:
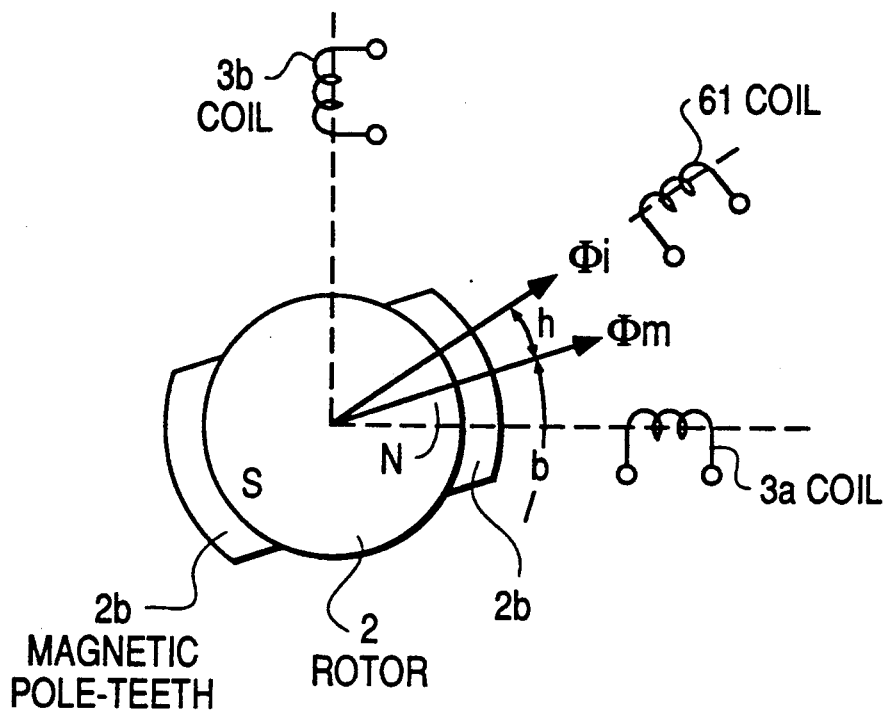
FIG. 6 is a schematic diagram showing a torque-generating mechanism of a driving unit shown in FIG. 1.

FIG. 6 schematically shows the torque generation mechanism of the driving unit 1 in FIG. 1. In FIG. 6, 3a and 3b are a coil. Φm indicates the magnetic pole vector of the rotor 2. (provided, the rotor 2 includes a magnet having a couple of magnetic pole for the sake of simplification, but practically, magnet having a couple of multi-poles or having arrays of magnetic pole-teeth of multi-poles is generally used.) The position detector 5a serves to detect a relative rotational position of the magnetic pole vector Φm to the coils 3a and 3b. This relative rotational position is expressed by b, but the b has an arbitrary relative reference position as its origin, so that its range can exceed $2\pi$ (rad) (=360°). Here, if currents to be flowed in these phases are respectively expressed by $I_A$ and $I_B$, then torques to be developed thereinto can be expressed as follows;

$$\text{A-phase; } -K_t \cdot I_A \cdot \text{SIN}(b) \tag{5a}$$

$$\text{B-phase; } K_t \cdot I_B \cdot \text{SIN}(\pi/2 - b) = K_t \cdot I_B \cdot \text{COS}(b) \tag{5b}$$

where,
Kt=torque coefficient,
b=position signal of the rotor 2

The currents to be supplied to the 2-phase coils 3a and 3b of the rotor 2 are changed into sine-wave in response to the 2-phase signals sc and ss outputted from the function generator 9. To the function generator 9 is inputted the electric angle signal e (=b+h) which is obtained by the electric angle signal h produced by the electric angle calculator 8 and the digital position signal b of the rotor 2 thereby to output the 2-phase sine-wave signals sc and ss in response to the signal e. As a result, the currents to be supplied to A-and B-phases of the coils 3a and 3b are respectively proportional to the 2-phase sine-wave signals sc and ss outputted from the function generator 9 and can be expressed as follows;

$$I_A = I_O \cdot \text{COS}(b+h) \tag{6a}$$

$$I_B = I_O \cdot \text{SIN}(b+h) \tag{6b}$$

where, $I_O$=crest value of current.

This means that the current magnetization vector Φi obtained by composing those of the coils 3a and 3b is formed at a position of (b+h) as shown at 61 in FIG. 6. In this case, however, the total generating torque can be found by Eqs. (5a), (5b), (6a) and (6b) as follows;

$$\begin{aligned} T &= K_t \cdot I_O\{-\text{SIN}(b) \cdot \text{COS}(b+h) + \\ &\quad \text{COS}(b) \cdot \text{SIN}(b+h)\} \\ &= K_t \cdot I_O \text{SIN}(h) \end{aligned} \tag{7}$$

This equation (7) explains that in the position control system of the present invention, the position control of the rotor becomes possible by freely controlling the digital position signal b and the phase of the composed current magnetization vector Φi of a plurality of coils in response to the position error signal c between the signal b and the position command signal a. Namely, by controlling the variable h in accordance with Eq. (7), the total generating torque T can be changed to provide the system with a desired characteristic for positioning. Here, if a position of the rotor 2 is expressed by (b−Δb) and a value of the position command signal a is b, then the position error c will become b, the variable h can be calculated based on this, and a torque can be generated in accordance with Eq. (7), so that the rotor 2 is rotated until Δb becomes zero. Finally, the position of the rotor 2 becomes b, which means that Δb, h and torque all become zero. Also, in the electric angle calculator 8, the electric angle signal g is produced by composing a proportional element, differential element and integral element of the position error signal c outputted from the comparator 7. The electric angle signal e is based on this signal g, so that by the action of the differential element which is a time differential signal contained in the signal e, a damping can be given to the control system electrically. As a result, vibration of the rotor 2 to be generated in positioning can be prevented, resulting in the reduction of the settling time. In addition, by the action of the integral element contained in the electric angle signal e, the static position error to be generated between the position command signal a and the digital position signal b can be depressed. This is because when and error is generated between the position command signal a and the digital position signal b by a friction or load torque, the position error signal c (=a−b) does not become zero, so that the integral element can be increased with a time according to Eq. (4). This serves to act the digital position signal b so as to gradually approach to the position command signal a, and the static position error can be depressed.

Next, functions and principle of the electric angle limiter in the process 34 shown in FIG. 4 and FIG. 5 (c) will be explained using FIGS. 7 and 8.

Figure 7:
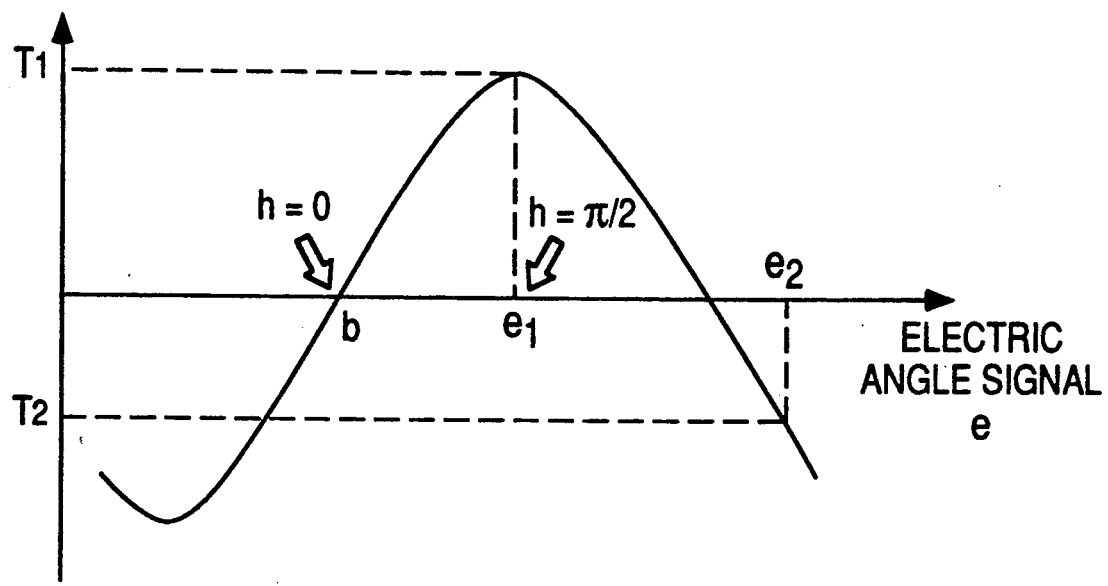
FIG. 7 exemplifies a static torque characteristic diagram of the driving unit of the position control system in FIG. 1.

FIG. 7 shows a static torque characteristic of a driving unit showing an example of the driving unit shown in FIG. 1. In each of FIGS. 7 and 8, the ordinate indicates a generating torque T and the abscissa indicates an electric angle signal e. As shown in Eq. (7), the generating torque T becomes a sine-wave function of the electric angle signal h, so that the generating torque T increases with a gradual increase in h from zero, and when e =e1 in FIG. 7, or h=$\pi/2$ (rad), the torque T peaks to give a value of T1, and when h exceeds $\pi/2$ (rad), it decreases. Also, if h exceeds $\pi$ (rad) to a point of e=e2 in FIG. 7, the sign of the generating torque is inverted to generate a torque T2 opposite in direction to the command signal and the control system can become unstable, resulting in the out of stepping in the worst possible case. As a result, it is necessary to control the absolute value of the electric angle signal h so as not to exceed $\pi/2\pi$ (rad).

Figure 8:
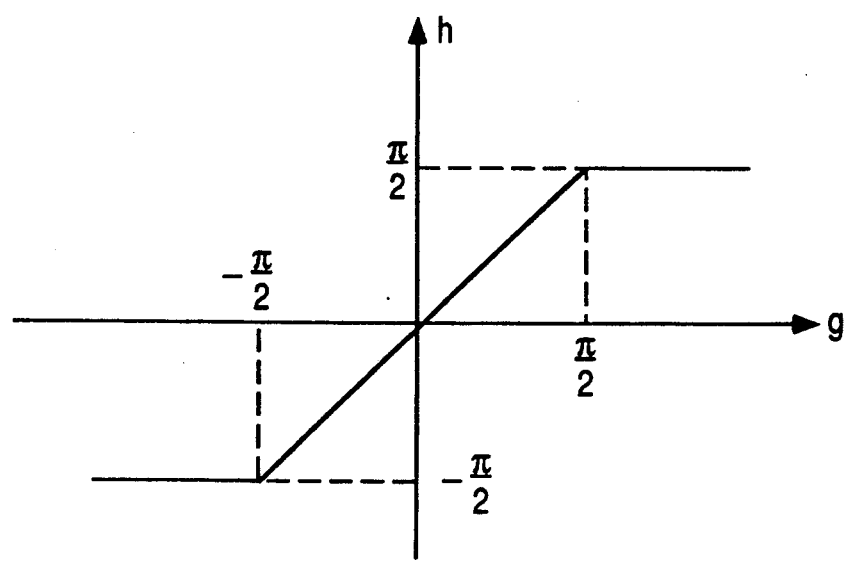
FIG. 8 is a characteristic diagram showing an example of the limitation characteristic of an electric angle limiter of the process 34 in FIG. 4 or FIG. 5 (c)

FIG. 8 shows a characteristic diagram showing an example of the limitation characteristic of the process 34 shown in FIG. 4 and FIG. 5 (c). In FIG. 8, the absolute value of the electric angle signal g is compared in advance with a predetermined constant $g_{MAX}$ (=$\pi/2$ [rad]) to limit its range and the result thus obtained is made as the electric angle signal h. Thus, the electric angle signal e can be limited within a certain range. With the structure as above, even wen the absolute value of an electric angle signal calculated through the electric angle calculator 8 exceeds $\pi/2$ (rad), by setting the operational signal (or the electric angle signal e) to a value to make the generating torque T maximum, the driving unit can be effectively accelerated and decelerated. As a result, whenever a position to be positioned is given by the position command signal a, the rotor 2 rotates smoothly to the position without giving out of stepping. In addition, $g_{MAX}$=$\pi/2$ (rad) is used as a limit in this embodiment, it is obvious that so far as the limit is below $\pi$ (rad), the driving unit can be provided with stable acceleration and deceleration.

In addition, in the above-mentioned examples, a motor having arrays of magnetic pole-teeth such as so-called stepping motor can be introduced into the mechanical part of the driving unit.

Figure 9A:
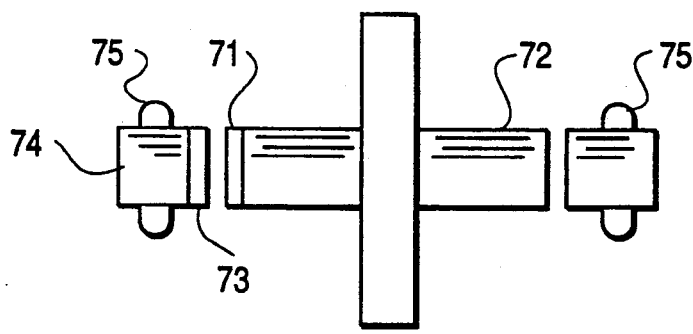
FIG. 9 (a) and (b), FIGS. 10 (a) and (b), FIGS. 11 (a) and (b) and FIGS. 12 (a) and (b) respectively show driving units applicable to the system according to the embodiment of the present invention, and FIGS. 13 (a), (b) and (c) are respectively concrete examples of a position detector 5a shown in FIG. 1.
Figure 9B:
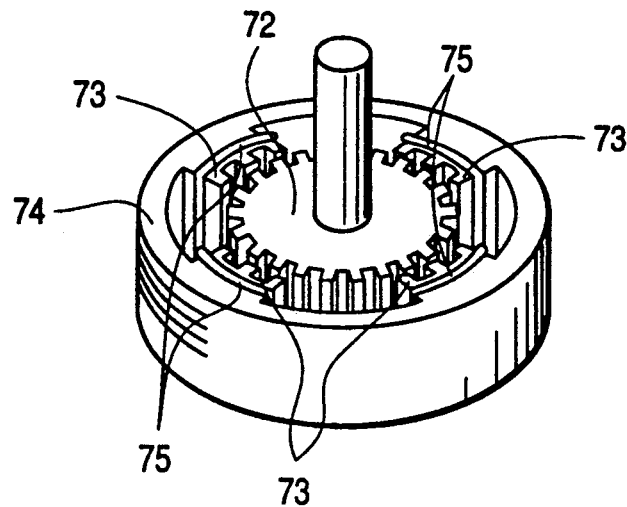

For example, as schematically shown in FIGS. 9 (a) and (b), a stepping motor of VR (variable reluctance) type can be applied, in which one of the rotor and the stator has magnetic material bodies 71 having arrays of magnetic pole-teeth 72 engraved at constant pitches and the other has a magnetic material core 74 having groups of magnetic pole-teeth 73 and a plurality of coils 75 wound on the magnetic material core 74.

Figure 10A:
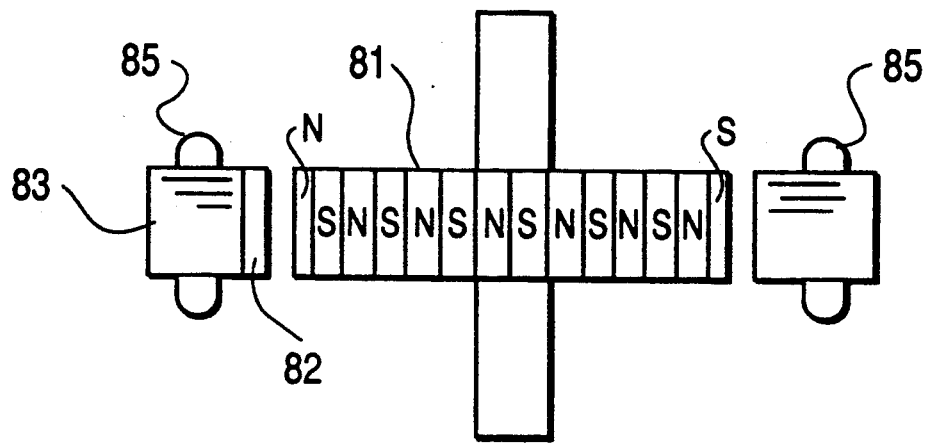
Figure 10B:
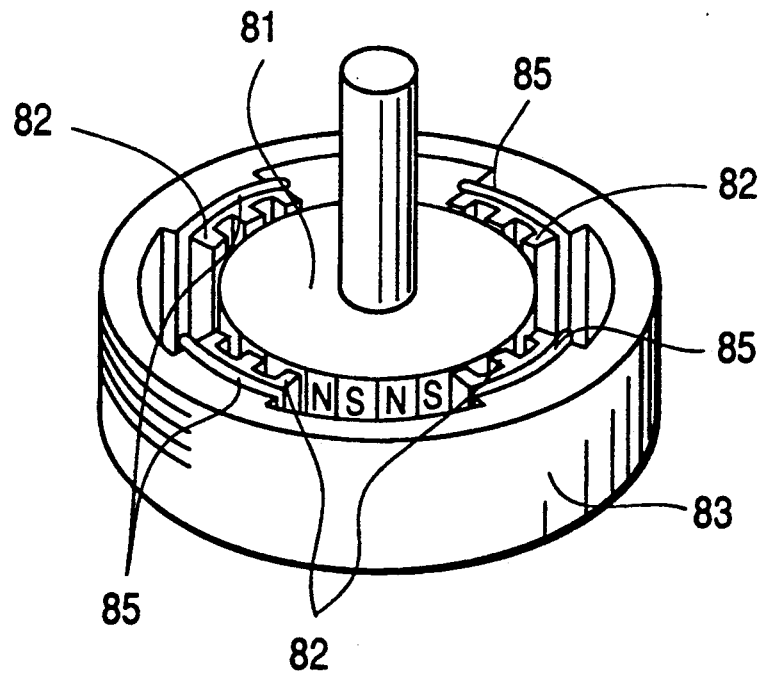

In addition, as schematically shown in FIGS. 10 (a) and (b), a stepping motor of PM (permanent magnet) type can be applied, in which one of the rotor and the stator has a multi-pole magnetized permanent magnet 81 and the other has a magnetic material core 83 having groups of magnetic pole-teeth 82 in confronting relation to the magnet 81 and a plurality of coils 85 wound on the magnetic material core 83.

Figure 11A:
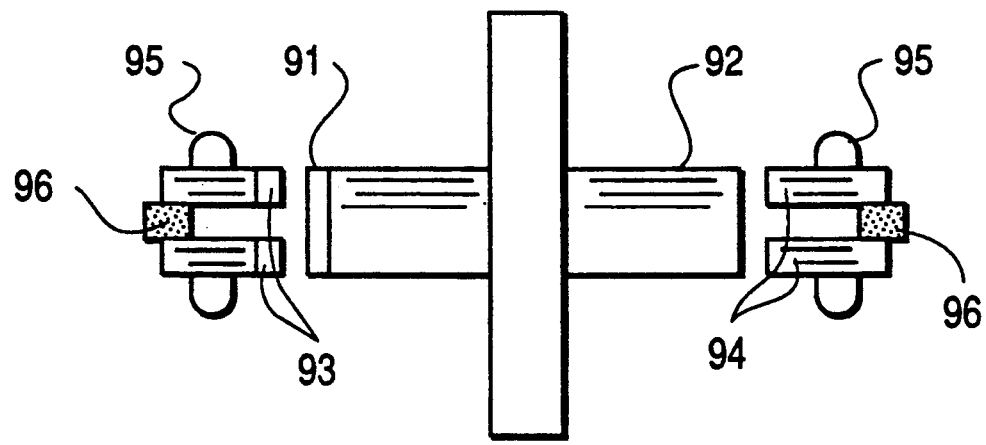
Figure 11B:
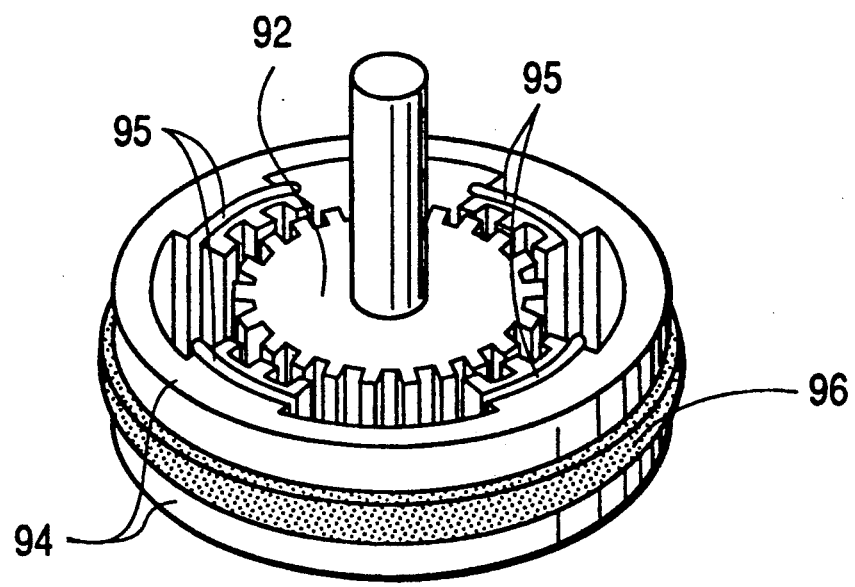

Further in addition, as schematically shown in FIGS. 11 (a) and (b), a stepping motor of hybrid-permanent-magnet type can be applied, in which one of the rotor and the stator has magnetic material bodies 92 having arrays of magnetic pole-teeth 91 engraved at constant pitches and the other has a magnetic material core 94 having groups of magnetic pole-teeth 93, a plurality of coils 95 wound on the magnetic material core 94 and a permanent magnet 96 for generating a bias magnetic field.

Figure 12A:
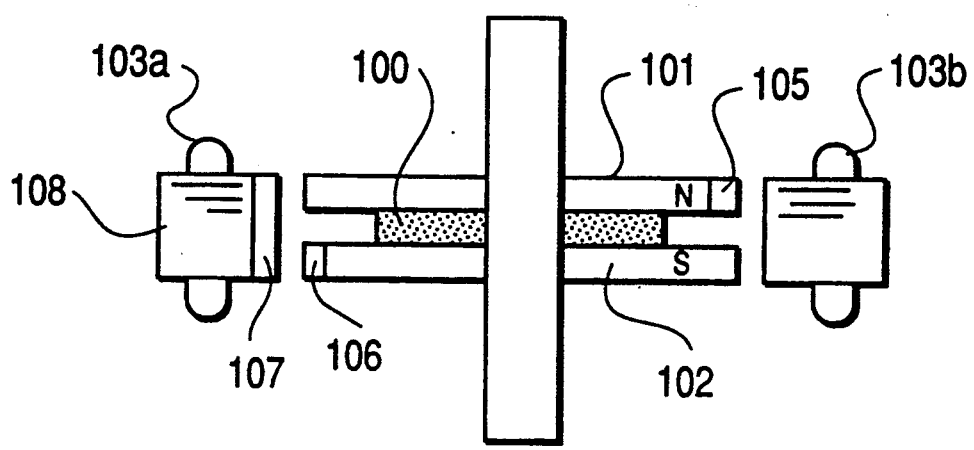
Figure 12B:
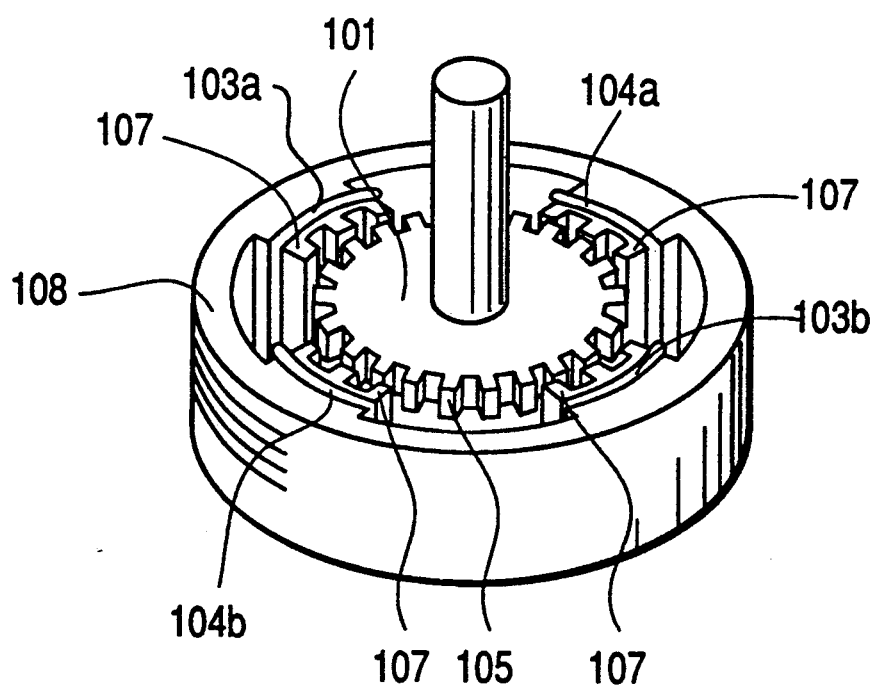

Still further in addition, as schematically shown in FIGS. 12 (a) and (b), a hybrid PM type stepping motor can be applied, in which one of the rotor and the stator has magnetic material bodies, 101 and 102 respectively having arrays of magnetic pole-teeth 105 and 106 engraved at constant pitches and a permanent magnet 100 for generating a bias magnetic field and the other has a magnetic material core 108 having groups of magnetic pole-teeth 107 and a plurality of coils 103a, 104a, and 104b wound on the magnetic material core 108. Such a motor that is provided with arrays of magnetic pole-teeth makes it possible to produce a large torque using a small current, so that its application largely contribute to power saving and compactization.

Figure 13A:
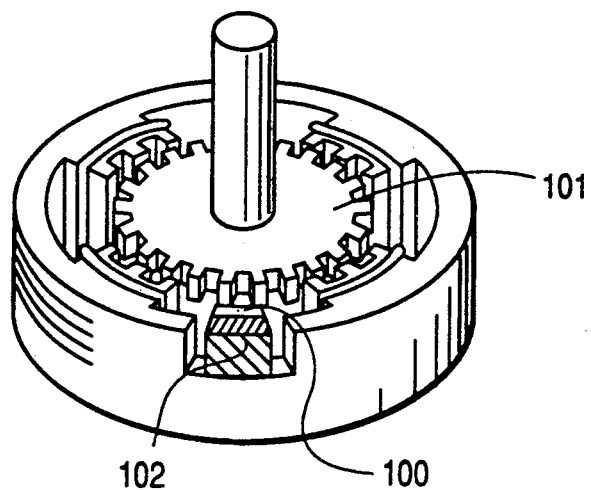
Figure 13B:
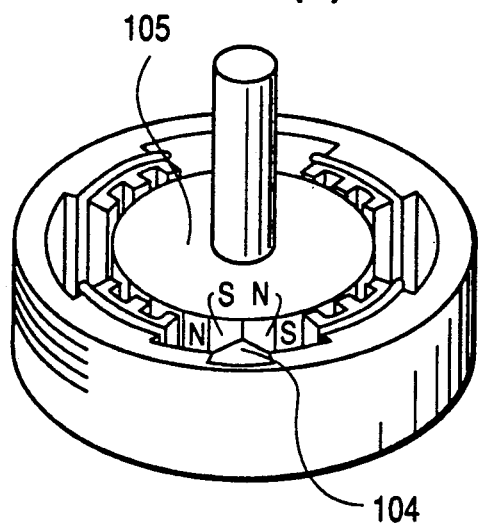
Figure 13C:
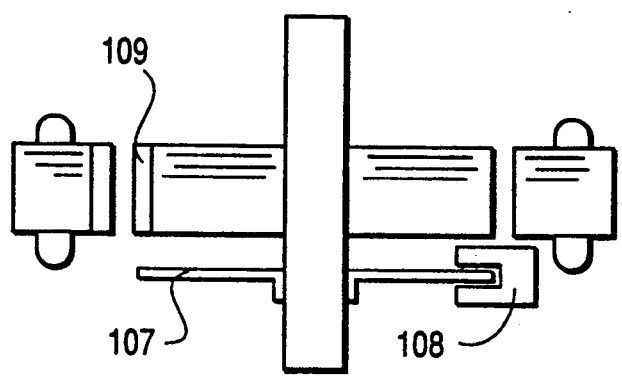

FIGS. 13 (a), (b) and (c) are concrete examples of the position detector 5a in FIG. 1.

FIG. 13 (a) exemplifies a position detector using a plurality of magnetic sensors for magnetically detecting magnetic pole-teeth engraved at a constant pitch. In which, 100 indicates a magnetic resistor element and 102 is a detecting bias magnet. The magnetic resistor element 100 is under application of a magnetic field generated by the detecting bias magnet 102 disposed on its back side. As the magnetic pole-teeth 101 engraved at a constant pitch moves in front of the magnetic resistor element 100, the magnetic field is modulated and polyphase sine-wave alternating position signals are outputted.

FIG. 13 (b) exemplifies a position detector using a plurality of magnetic sensors for magnetically detecting a multi-pole magnetized permanent magnet, in which 104 indicates a Hall effect element for outputting polyphase sine-wave alternating position signals as the multi-pole magnetized permanent magnet 103 moves.

FIG. 13 (c) exemplifies a position detector using an optical detecting element for optically detecting a relative move between the rotor and the stator. In which, 107 is a slit plate and 108 is an optical detecting element having a luminous element and light receiving element disposed in opposite relation to each other. The slit plate 107 is provided with either stripe pattern or stripe-shaped holes. As the slit plate 107 moves, polyphase sine-wave alternating position signals are outputted. In FIG. 13 (c), magnetic pole-teeth 109 engraved at a constant pitch can be used instead of the slit plate 107 for picking-up the above-mentioned optical detecting element.

In addition, the driving unit 1 shown in FIG. 1 used a 2-phase, 2-coil motor, but the same effects can be obtained even by using a motor having phases and coils more than three. For this, the function generator 9 and the current feeder 10 should be modified in the number of phases. The function generator 9 does not have a limitation upon its function having to be of sine or cosine, but it has to be of periodically repeatable waveform. Also, it is allowed to be a function generating a waveform so as to correct a distortion the generating torque waveform of the driving unit 1.

In addition, in the above explanations, a rotation-type motor was used as the driving unit 1, but it is obvious that a linear motor can be applied for the driving unit 1 in FIG. 1.

Further in addition, the above explanations were made so that the position detector 5a for the rotor of the driving unit is to be connected directly to the rotating axis of a motor, but it can be connected to a movable member to be driven. Also, it is unnecessary to be of a rotary type and it is obvious that it can be of a linear type. Furthermore, its output is not necessarily to be of 2-phase or sine-wave, being capable of having phases more than three.

Further in addition, in examples shown in FIGS. 3 and 4, the processes were explained on a software basis, but they can be made on a hardware basis.

What is claimed is:

1. A position control apparatus having a driving means including a mover and a stator giving a moving force to the mover relative thereto, said position control apparatus comprising:
   a position detector means for outputting polyphase alternating signals different in phase from each other in response to a relative movement of said mover to said stator;
   a carrier signal generator means for generating a carrier signal modulated by said polyphase alternating signals;
   a digital position information signal generator means including a digital sample-holder means for demodulating phase-angle information of said modulated carrier signal to digitally produce relative position information indicative of a relative position between said mover and stator;
   a digital calculator means for calculating a driving signal in response to an error between the relative position information and an externally given position command signal; and
   a current feeder means for feeding currents to said driving means in response to the driving signal.

2. An apparatus according to claim 1, wherein said mover and said stator has magnetic material bodies having arrays of magnetic pole-teeth engraved at constant pitches and the other has a magnetic material core having a plurality of groups of magnetic pole-teeth in confronting relation to said arrays of magnetic pole-teeth and a plurality of coils wound on said magnetic material core.

3. An apparatus according to claim 1, wherein said mover and said stator has a magnetic material bodies having arrays of magnetic pole-teeth engraved at constant pitches and a permanent magnet for generating a bias magnetic field and the other has a magnetic material core having a plurality of groups of magnetic pole-teeth in confronting relation to said arrays of magnetic pole-teeth and a plurality of coils wound on said magnetic material core.

4. An apparatus according to claim 1, wherein said mover and said stator has magnetic material bodies having arrays of magnetic pole-teeth engraved at constant pitches and the other has a magnetic material core having a plurality of groups of magnetic pole-teeth in confronting relation to said arrays of magnetic pole-teeth, a plurality of coils wound on said magnetic material core and a permanent magnet for generating a bias magnetic field.

5. An apparatus according to claim 1, wherein said mover and said stator has a multi-pole magnetized permanent magnet and the other has a magnetic material core having a plurality of groups of magnetic pole-teeth in confronting relation to said permanent magnet and a plurality of coils wound on said magnetic material core.

6. An apparatus according to claim 1, wherein said position detector means outputs polyphase, approximately sinusoidal alternating signals different in phase from each other in response to a relative movement between said mover and said stator.

7. An Apparatus according to claim 2, claim 3 or claim 4, wherein said position detector means has a plurality of magnetic sensors of magnetically detecting said arrays of magnetic pole-teeth engraved at constant pitches.

8. An apparatus according to claim 5, wherein said position detector means has a plurality of magnetic sensors for magnetically detecting said multi-pole magnetized permanent magnet.

9. An apparatus according to claim 6, wherein said position detector means has an optical sensor which optically detects a relative movement of said mover and said stator using either arrays of magnetic pole-teeth engraved at constant pitches or optical scales thereby to output polyphase, approximately sinusoidal alternating signals different in phase from each other.

10. An apparatus according to claim 1, wherein said digital position information signal generator means has a plurality of modulator means for modulating the carrier signals by the polyphase alternating signals outputted from said position detector means.

11. An apparatus according to claim 1, wherein said digital sample-holder means has a reference clock generator means, a digital counter means for counting a reference clock from said reference clock generator means and a temporary memory means for sample-holding, so that a count content of said digital counter means can be held in said temporary memory means by a sample-hold signal.

12. An apparatus according to claim 11, wherein said sample-hold signal is produced in accordance with either carrier signals or modulated carrier signals.

13. An apparatus according to claim 1, wherein said digital calculator means digitally calculates a proportional signal proportional to an error signal between a relative position information signal of said mover and said stator and a position command signal from the outside and a differential signal which is a differential element of said error signal and then digitally calculates a driving signal based on the result thus obtained.

14. An apparatus according to claim 1, wherein said digital calculator means digitally calculates an integral signal obtained by integrating an error signal between a relative position information signal of said mover and said stator and a position command signal from the outside by time and then digitally calculates a driving signal based on the result thus obtained.

15. An apparatus according to claim 1, said digital calculator means has a function generator means which includes memory means with tabulated data in accordance with a specific function, executes a predetermined digital calculation in response to an error signal between a relative position information signal of said mover and said stator and a position command signal from the outside, then reads data in accordance with said specific function from said memory means in response to the result thus calculated and outputs the data thus read as a driving signal to said current feeder means.

16. An apparatus according to claim 15, wherein said data in accordance with a specific function to be readout from said memory means of said function generator means are approximately sinusoidal waves with polyphases different from each other.

17. An apparatus according to claim 1, wherein said digital calculator means comprises a memory means for storing a program in accordance with the content to be processed and predetermined data, a sequencer means for controlling the proceedings, and a computer unit means for executing computations in accordance with said program and said data.

18. A position control apparatus having a driving means including a mover and a stator giving a moving force to the mover relative thereto, said position control apparatus comprising:
a position detector means for outputting polyphase alternating signals different in phase from each other in response to a relative movement of said mover to said stator;
said mover and said stator being provided with magnetic material bodies having arrays of magnetic pole-teeth engraved at constant pitches;
a carrier signal generator means for generating carrier signals modulated by said polyphase alternating signals;
a digital position information signal generator means including a summing circuit means for summing the modulated carrier signals, a low-pass filter means for removing harmonic components from the signal thus summed-up, and a digital sample-holder means for demodulating phase-angle information of said modulated carrier signals to digitally produce a relative position information indicative of a relative position between said mover and said stator;
a digital calculator means for calculating a driving signal in response to an error between the relative position information and an externally given position command signal; and
a current feeder means for feeding currents to said driving means in response to the driving signal.

19. An apparatus according to claim 18, wherein said mover and said stator has magnetic material bodies having arrays of magnetic pole-teeth engraved at constant pitches and the other has a magnetic material core having a plurality of groups of magnetic pole-teeth in confronting relation to said arrays of magnetic pole-teeth and a plurality of coils wound on said magnetic material core.

20. An apparatus according to claim 18, wherein said mover and said stator has magnetic material bodies having arrays of magnetic pole-teeth at constant pitches and a permanent magnet for generating a bias magnetic field, and the other has a magnetic core having a plurality of groups of magnetic pole-teeth in confronting relation to said arrays of magnetic pole-teeth and a plurality of coils wound on said magnetic material core.

21. An apparatus according to claim 18, wherein said mover and said stator has magnetic material bodies having arrays of magnetic pole-teeth engraved at constant pitches and the other has a magnetic material core having a plurality of groups of magnetic pole-teeth in confronting relation to said arrays of magnetic pole-teeth, a plurality of coils wound on said magnetic material core and a permanent magnet for generating a bias magnetic field.

22. An apparatus according to claim 18, wherein said mover and stator has a multi-pole magnetized permanent magnet and the other has a magnetic material core having a plurality of groups of magnetic pole-teeth in confronting relation to said permanent magnet and a plurality of coils wound on said magnetic material core.

23. An apparatus according to claim 18, wherein said digital calculator means digitally calculates a proportional signal proportional to an error signal between a relative position information signal of said mover and said stator and a position command signal from the outside and a differential signal which is a differential element of said error signal and then digitally calculates a driving signal based the result thus obtained.

24. An apparatus according to claim 18, wherein said digital calculator means digitally calculates an integral signal obtained by integrating an error signal between a relative position information signal of said mover and said stator and a position command signal from the outside by time and then digitally calculates a driving signal based on the result thus obtained.

25. An apparatus according to claim 18, wherein the digital calculator means comprises a memory means for storing a program in accordance with the content to be processed and predetermined data, a sequencer means for controlling the proceedings and a computer unit means for executing computations in accordance with said program and said data.

26. A position control apparatus having a driving means including a mover and a stator giving a moving force to the mover relative thereto, said position control apparatus comprising:
a position detector means for outputting polyphase, approximately sinusoidal alternating signals different in phase from each other in response to a relative movement of said mover to said stator;
said mover and said stator being provided with magnetic material bodies having arrays of magnetic pole-teeth engraved at constant pitches;
a carrier signal generator means for generating carrier signals;
a plurality of modulator means for modulating said carrier signals by said polyphase alternating signals outputted from said position detector means;
a digital position information signal generator means including summing circuit means for summing the modulated carrier signals, low-pass filter means for removing harmonic components from the signal thus summed-up, and digital sample-holder means for demodulating phase-angle information of said modulated carrier signals to digitally produce relative position information indicative of a relative position of said mover to said stator;
said sample-holder means including a reference clock generator means, digital counter means for counting said reference clock and temporary memory means for sample-holding thereby to hold the count content of said digital counter means into said temporary memory means by a sample-hold signal;

a digital calculator means for calculating a driving signal in response to an error between the relative position information and an externally given position command signal; and a function generator means provided into said digital calculator means and having a memory means with tabulated data in accordance with a specific function for reading data in accordance with said specific data from said memory means in response to said error signal thereby to send the data thus read to a current feeder means as a driving signal;

said current feeder means feeding currents to said driving means in response to this driving signal.

27. An apparatus according to claim 26, wherein said mover and said stator has magnetic material bodies having arrays of magnetic pole-teeth engraved at constant pitches and the other has a magnetic material core having a plurality of groups of magnetic pole-teeth in confronting relation to said arrays of magnetic pole-teeth and a plurality of coils wound on said magnetic material core.

28. An apparatus according to claim 26, wherein said mover and said stator has magnetic material bodies having arrays of magnetic pole-teeth engraved at constant pitches and a permanent magnet for generating a bias magnetic field and the other has a magnetic material core having a plurality of groups of magnetic pole-teeth in confronting relation to said arrays of magnetic pole-teeth and a plurality of coils wound on said magnetic material core.

29. An apparatus according to claim 26, wherein said mover and said stator has magnetic material bodies having arrays of magnetic pole-teeth engraved at constant pitches and the other has a magnetic material core having a plurality of groups of magnetic pole-teeth in confronting relation to said arrays of magnetic pole-teeth, a plurality of coils wound on said magnetic material core and a permanent magnet for generating a bias magnetic field.

30. An apparatus according to claim 26, wherein said mover and said stator has a multi-pole magnetized permanent magnet and the other has a magnetic material core having a plurality of groups of magnetic pole-teeth in confronting relation to said permanent magnet and a plurality of coils wound on said magnetic material core.

31. An apparatus according to claim 26, wherein said position detector means has a plurality of magnetic sensors for magnetically detecting said magnetic pole-teeth engraved at a constant pitch.

32. An apparatus according to claim 26, wherein said position detector means has a plurality of magnetic sensors for magnetically detecting a multi-pole magnetized permanent magnet.

33. An apparatus according :to claim 26, wherein said position detector means has an optical sensor for optically detecting a relative movement of said mover and said stator using either magnetic pole-teeth or optical scales thereby outputting polyphase, approximately sinusoidal alternating signals different in phase from each other.

34. An apparatus according to claim 26, wherein said digital calculator means includes a memory means for storing a program in accordance with the content to be processed and predetermined data, a sequencer means for controlling the proceedings and a computer unit means for executing computations in accordance with said program and said data.

* * * * *